UNITED STATES PATENT OFFICE.

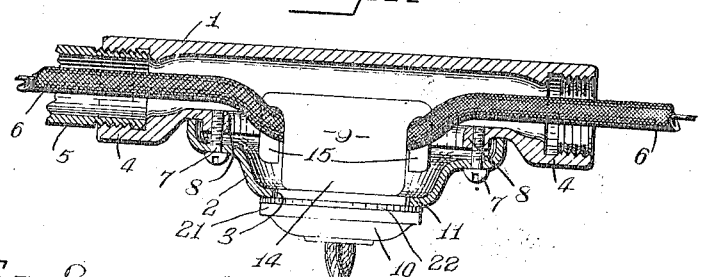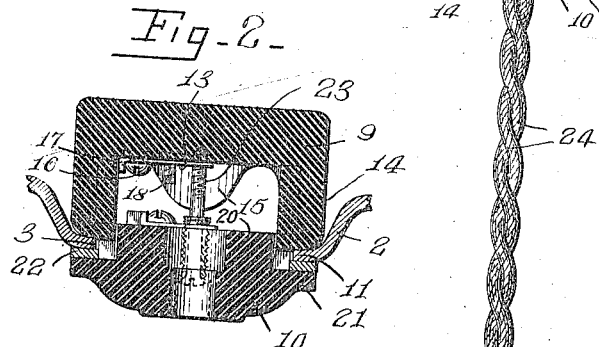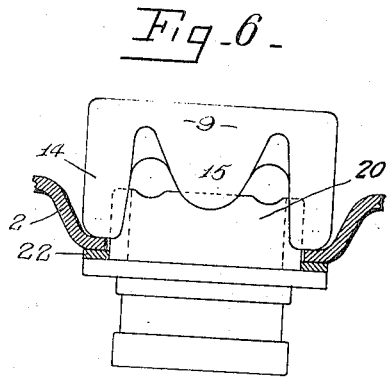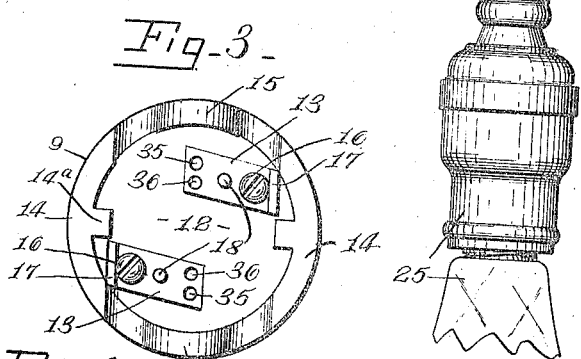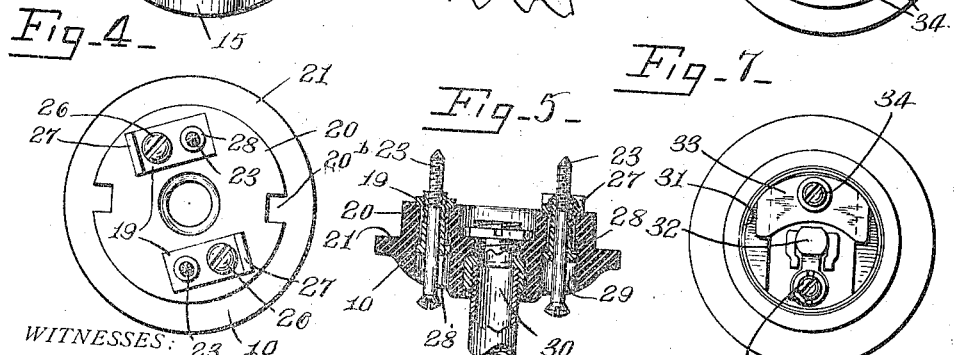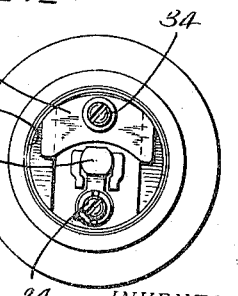

CARL H. BISSELL, OF SYRACUSE, NEW YORK, ASSIGNOR TO CROUSE-HINDS COMPANY, OF SYRACUSE, NEW YORK, A CORPORATION OF NEW YORK.

ELECTRICAL RECEPTACLE FOR CONDUIT OUTLET-BOXES.

1,216,406.

Specification of Letters Patent. Patented Feb. 20, 1917.

Application filed December 27, 1910. Serial No. 599,354.

*To all whom it may concern:*

Be it known that I, CARL H. BISSELL, of Syracuse, in the county of Onondaga and State of New York, have invented a new and useful Electrical Receptacle for Conduit Outlet-Boxes, of which the following is a specification.

This invention has for its object the production of an electrical receptacle adapted to be used in connection with conduit outlet boxes; and it consists in the combinations and constructions hereinafter set forth and claimed.

In describing this invention reference is had to the accompanying drawing in which like characters designate corresponding parts in all the views.

Figure 1 is a longitudinal sectional view through a conduit outlet box provided with one form of my invention.

Fig. 2 is a transverse sectional view through the receptacle, the contiguous portion of the wall of the conduit outlet box supporting the receptacle being also shown.

Fig. 3 is a plan of the base of the receptacle.

Fig. 4 is an inverted plan of one form of cap for the base.

Fig. 5 is a sectional view through the cap, taken at a right angle to the section thereof shown in Fig. 2.

Fig. 6 is an elevation of a receptacle provided with another form of cap, the adjacent portion of the supporting wall of the conduit outlet box being also shown.

Figs. 7 and 8 are, respectively, a plan and an inverted plan of the cap shown in Fig. 6.

This invention is particularly adapted for use with an electric conduit outlet box formed with a passage in one wall thereof, and comprises generally a receptacle extending into the box through the passage and having terminals for connection with the wires in the box and for connection with an electrical appliance, the receptacle having means for coacting with the margin of the wall around such passage whereby the receptacle is supported by such wall.

1 is the conduit outlet box having an opening in one side thereof, and a removable wall 2 serving as a cover for such opening, such wall 2 being formed with a passage 3 therein. The box 1 is also formed with suitable means, as nipples 4, for connection with the conduits, as the conduit 5, through which the wires 6 enter and leave the box.

The removable wall 2 is secured to the box in any suitable manner, as by screws 7, extending through the wall 2 and threading into lugs provided on the box, as the lugs 8.

The receptacle comprises a base 9, a cap 10 and means for clamping the base and cap together and also securing the receptacle to the removable wall 2; the base 9 being located in the box and having terminals for connection with the wires 6 in the box, and the cap having terminals for connection with the terminals on the base and with an electrical appliance, the cap 10 closing the passage 3, and the base 9 and the cap 10 having surfaces arranged on opposite sides of the margin 11 of the wall 2, around the passage 3.

As here shown the base is circular in form and is formed with a substantially flat surface 12 opposed to the passage 3 and upon which terminals 13 are mounted, for connection with the wires 6, and with diametrically disposed segmental peripheral projections or guides 14 projecting from the surface 12 toward the passage 3 and terminating near the margin 11 of the wall 2 around the passage 3. The base is also formed with other diametrically disposed projections 15 arranged midway between the projections or guides 14 and serving to space the wires 6 connected, respectively, to the terminals 13. The side edges of the projections 15 diverge from the side edges of the projections 14 toward the free ends of said projections 15 for forming between the projections 14 and 15 wire-receiving spaces opening through the periphery of the base and increasing in width toward the free ends of the projections 14 and 15. Said terminals 13 extend in opposite directions from a diameter of the base extending in the direction of the wires 6 and are located on opposite sides of the diameter intersecting the first-mentioned diameter at a right angle; and the terminals 13 are provided with binding devices located close to the projections or guides 14. Such binding devices consist of clamping screws 16 which coact with lips 17 provided on the terminals 13. The terminals 13 are secured to the surface 12 by screws 18 extending into the base from the rear side thereof.

The base 9 is unprovided with means for securing it directly to the box 1 and usually the wires 6 are pulled out of the box, stripped of insulation and secured to the terminals 13, and the base and cap are then clamped to the removable wall 2, as hereinafter explained, prior to the placing of such wall in position.

The cap supports terminals 19 adapted to be connected respectively to the terminals 13 and is formed with a reduced portion 20 extending through the passage 3 and between the guides or projections 14 to a point near the free ends of the projections 15. The cap is also provided with a flange 21 lapping the outer face of the margin 11 of the wall 3 around the passage 4, and coacting with the end surfaces of the projections or guides 14 for securing the receptacle in position. The projections or guides 14 and reduced portion 20 are provided with interfitting means, as tenons 14ª and mortises 20ᵇ the tenons 14ª extending lengthwise of the inner faces of the projections 14 midway between their side edges and projecting inwardly from said faces, and the mortises or grooves 20ᵇ extending lengthwise of the periphery of the reduced part 20 of the cap 10. The opposing surfaces of the flange 21 and the projections or guides 14 and the contiguous part of the periphery of the portion 20 form a groove for receiving the margin 11 of the wall 2. Usually a washer 22 is interposed between the flange 21 and said margin 11.

The base and cap are clamped together by screws 23, the screws also serving to clamp the base and cap on the margin 11 of the wall 2 and also to electrically connect corresponding terminals 13 and 19. In Figs. 1 to 5 inclusive the cap is in the form of a rosette and the terminals 19 are connected to wires 24 to which a drop lamp 25 is connected, such terminals 19 being shown as provided with binding screws 26 coöperating with lips 27 similar to the screws 16 and lips 17 of the terminals 13.

The terminals 19 are shown as secured to the cap 9 by hollow screws 28 arranged in passages 29 in the cap and the clamping screws 23 extend through the hollow screws 28. The wires 24 connected to the terminals 19 extend through a suitable coupling 30 arranged axially on the cap.

However, as seen in Figs. 6, 7 and 8 the cap may be provided with another arrangement of terminals, it being shown in Figs. 6, 7 and 8 as a lamp socket and as having an outer or sleeve terminal 31 and an inner or central terminal 32, the sleeve terminal 31 being held in position by an arc-shape clamping piece 33 resting on ledges at the bottom of the sleeve 31, and the base and cap being clamped together by screws 34 extending through the piece 33 and the central terminal 32 and threading into the terminals on the base.

The terminals 13 of the base are provided with two sets of screw holes 35, 36, one set as 35 of which are spaced apart proper distance to receive the screws 23 and the other set as 36 being spaced apart proper distance to receive the screws 34.

What I claim is:

1. An electrical appliance comprising a base member having a flat face, a pair of segmental peripheral projections extending in advance of said face and disposed on opposite sides of the base, and a second pair of peripheral projections located between the segmental projections and being of less height than the same and having their side edges converging toward the free ends of said projections forming gradually widening wire spaces between the edges of the two pairs of projections, terminals mounted on the face of the base and having binding devices in line with the spaces between the two pairs of projections, a cover having a part extending between the first-mentioned pair of projections to a point near the free ends of the second pair of projections, and a flange opposed to the end edges of the first pair of projections and coacting therewith to clamp a support for the appliance, terminals secured to the inner face of the cover member, and means for electrically and mechanically connecting the latter terminals to the terminals on the base, substantially as and for the purpose described.

2. An electrical appliance comprising a base member having a flat face, a pair of segmental peripheral projections extending in advance of said face and disposed on opposite sides of the base, tenons extending lengthwise of the inner faces of the projections and projecting inwardly from said faces, and a second pair of peripheral projections located between, and spaced apart from, the first-mentioned projections and being of less height than the same and having their side edges diverging from the side edges of the first-mentioned projections toward the free ends of said projections and forming between the first-mentioned projections and the second projections, wire-receiving spaces opening through the periphery of the base and increasing in width toward the free ends of the projections, terminals mounted on the face of the base and having binding devices in line with the wire-receiving spaces between the projections, a cover having a part extending between the first-mentioned pair of projections to a point near the free ends of the second pair of projections, and having lengthwise grooves in its periphery to receive the tenons, and a flange opposed to the end edges of the first pair of projections and coacting therewith to clamp a support for the appliance, terminals secured to the inner face of the cover, and means for electrically and mechanically connecting the latter terminals to the terminals on the base, substantially as and for the purpose specified.

In testimony whereof, I have hereunto signed my name in the presence of two attesting witnesses, at Syracuse, in the county of Onondaga, in the State of New York, this 25th day of November, 1910.

CARL H. BISSELL.

Witnesses:
C. C. SCHOENECK,
LYNFORD J. WELLS.